(12) United States Patent
Wolke et al.

(10) Patent No.: US 10,834,377 B2
(45) Date of Patent: Nov. 10, 2020

(54) FORENSIC THREE-DIMENSIONAL MEASUREMENT DEVICE

(71) Applicant: FARO Technologies, Inc., Lake Mary, FL (US)

(72) Inventors: Matthias Wolke, Korntal-Muenchingen (DE); Denis Wohlfeld, Ludwigsburg (DE); Bernd-Dietmar Becker, Ludwigsburg (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 70 days.

(21) Appl. No.: 15/669,099

(22) Filed: Aug. 4, 2017

(65) Prior Publication Data

US 2018/0063510 A1    Mar. 1, 2018

Related U.S. Application Data

(60) Provisional application No. 62/380,760, filed on Aug. 29, 2016.

(51) Int. Cl.
*H04N 13/00* (2018.01)
*H04N 13/20* (2018.01)
(Continued)

(52) U.S. Cl.
CPC ............. *H04N 13/254* (2018.05); *G06T 5/20* (2013.01); *H04N 5/23293* (2013.01); *H04N 13/106* (2018.05); *H04N 13/239* (2018.05); *H04N 13/243* (2018.05); *H04N 13/257* (2018.05); *H04N 13/271* (2018.05)

(58) Field of Classification Search
None
See application file for complete search history.

(56) References Cited

U.S. PATENT DOCUMENTS 5,938,908 A * 8/1999 Anazawa ......... G01N 27/44721
   204/603
6,127,189 A * 10/2000 Joullie .................. C07C 45/516
   422/504

(Continued)

OTHER PUBLICATIONS http://brightbeamlaser.com/BrightBeam_Dual_Product.html (2015 BrightBeam Forensic Lasers) 3 pgs.

(Continued)

*Primary Examiner* — Mohammad J Rahman
(74) *Attorney, Agent, or Firm* — Cantor Colburn LLP

(57) ABSTRACT

A three-dimensional (3D) forensic evidence system is provided. The system includes a noncontact measurement device operable to measure a distance from the device to a surface. A first camera is operably coupled to the noncontact measurement device, the first camera having a field of view. A light source is operably coupled to the first camera and operable to emit light onto the surface within the field of view. A processor operably is coupled to the first camera, the processor operable to execute computer instructions when executed on the processor for determining 3D coordinates of at least one point in the field of view based at least in part on the distance, and assigning at least one color value to the at least one point in response to determining an interaction of a predefined wavelength of light with a substance in the field of view.

23 Claims, 13 Drawing Sheets

(51) Int. Cl.
*H04N 5/232* (2006.01)
*G06T 5/20* (2006.01)
*H04N 13/254* (2018.01)
*H04N 13/106* (2018.01)
*H04N 13/257* (2018.01)
*H04N 13/239* (2018.01)
*H04N 13/243* (2018.01)
*H04N 13/271* (2018.01)

(56) References Cited

U.S. PATENT DOCUMENTS

| | | | | |
|---|---|---|---|---|
| 6,160,618 | A * | 12/2000 | Garner | G01N 21/6456 250/458.1 |
| 9,042,967 | B2 | 5/2015 | Dacosta et al. | |
| 9,325,973 | B1 * | 4/2016 | Hazeghi | G01B 11/2513 |
| 2005/0180020 | A1 * | 8/2005 | Steenblik | B42D 25/29 359/626 |
| 2005/0203420 | A1 * | 9/2005 | Kleen | A61B 5/0071 600/476 |
| 2005/0231966 | A1 | 10/2005 | Ostler et al. | |
| 2006/0013486 | A1 * | 1/2006 | Burns | G06T 7/001 382/195 |
| 2006/0210146 | A1 * | 9/2006 | Gu | G06K 9/2018 382/154 |
| 2007/0242324 | A1 * | 10/2007 | Chen | G02B 27/2271 359/9 |
| 2008/0012850 | A1 * | 1/2008 | Keating, III | H04N 13/254 345/419 |
| 2008/0204569 | A1 * | 8/2008 | Miller | H04N 21/234318 348/222.1 |
| 2008/0277626 | A1 * | 11/2008 | Yang | C09D 11/30 252/301.36 |
| 2009/0285448 | A1 * | 11/2009 | Carpenter | G06Q 30/0283 382/101 |
| 2010/0084563 | A1 | 4/2010 | Ohno | |
| 2010/0140461 | A1 * | 6/2010 | Sprigle | G01J 3/2823 250/226 |
| 2011/0043661 | A1 * | 2/2011 | Podoleanu | G01B 9/02069 348/239 |
| 2011/0194728 | A1 * | 8/2011 | Kutcka | G02B 27/26 382/100 |
| 2011/0285982 | A1 * | 11/2011 | Breed | B60N 2/002 356/4.01 |
| 2012/0015318 | A1 * | 1/2012 | Kasenbacher | A61C 1/0046 433/29 |
| 2012/0033069 | A1 * | 2/2012 | Becker | G01S 17/89 348/135 |
| 2012/0123205 | A1 * | 5/2012 | Nie | A61B 1/00174 600/109 |
| 2012/0199655 | A1 * | 8/2012 | Fukuba | G02B 3/14 235/455 |
| 2013/0012794 | A1 * | 1/2013 | Zeng | A61B 1/00186 600/328 |
| 2014/0286566 | A1 * | 9/2014 | Rhoads | G06T 5/001 382/154 |
| 2014/0320942 | A1 * | 10/2014 | Rosen | G03H 1/06 359/11 |
| 2015/0304518 | A1 * | 10/2015 | Rodriguez Diaz | H04N 1/40056 358/473 |
| 2016/0018526 | A1 * | 1/2016 | Van Den Bossche | G01C 7/04 356/3.11 |
| 2016/0140381 | A1 * | 5/2016 | Weiner | G06K 9/00087 382/124 |
| 2016/0371526 | A1 * | 12/2016 | Su | G06K 7/1413 |
| 2016/0379370 | A1 * | 12/2016 | Nakazato | G01B 11/24 382/103 |
| 2017/0155818 | A1 * | 6/2017 | Bonnet | G02B 27/106 |
| 2018/0270474 | A1 * | 9/2018 | Liu | G06K 9/00201 |

OTHER PUBLICATIONS http://www.caogroup.com/ultraliteone.html (2015 CAO Group Inc) 3 pgs.
htttp://www.sirchie.com/forensics/alternate-light-sources.html (2017 Sirchie) 4 pgs.
https://spexforensics.com/products/item/crimescope-cs-16-500w (2017 SPEX Forensics) 4 pgs.
https://www.lynnpeavey.com/index.php?cPath=22_37 (All Light Source—Peavey Company) 3 pgs.
https://www.shopevident.com/category/forensic-light-sources (2017 Evident, Inc.) 5 pgs.
https://en.wikipedia.org/wiki/Surface_triangulation "Surface triangulation"—Wikipedia (4 pgs) edited Nov. 6, 2016, retrieved Sep. 18, 2017.
Thoma, et al., 9th Future Security, Berlin, Sep. 16-18, 2014, Proceedings p. 215 (ISBN 978-3-8396-0778-7).
www.3d-forensics.de "3D-Forensics/FTI Mobile high-resolution 3D-Scanner and 3D data analysis for forensic evidence" 3D Forensics (2 pgs), retrieved Sep. 18, 2017.
www.dx.com/de/p/200mw-532nm-green-laser-module-3v-11-9mm-26891 "200mW 532nm Green Laser Module (3V 11.9mm)" (5 pgs) retrieved Sep. 18, 2017.
www.horiba.com/fileadmin/uploads/Scientific/Documents/Forensics/fls.pdf "Forensic Light Source Applications: Wavelengths and Uses" Crimescope Spex Forensics (4 pgs) Apr. 24, 2016, retrieved Sep. 18, 2017.
www.lasercomponents.com/us/product/pulsed-laser-diodes-with-fiber-pigtail/ "Pulsed Laser Diodes with Fiber Pigtail—Pulsed Laser Diodes" 2017 Laser Components (8 pgs) Aug. 9, 2016, retrieved Sep. 18, 2017.
www.roithner-laser.com/datasheets/laser/laser_modules/cw532-030.pdf rev 2.0 Nov. 15, 2018 (3 pgs) retrieved Sep. 18, 2017.

* cited by examiner

FORENSIC THREE-DIMENSIONAL MEASUREMENT DEVICE

CROSS REFERENCE TO RELATED APPLICATIONS

This application claims the benefit of U.S. Provisional Application Ser. No. 62/380,760, filed Aug. 29, 2016, the entire disclosure of which is incorporated herein by reference.

BACKGROUND

The subject matter disclosed herein relates to a three-dimensional (3D) measurement device, and in particular to a 3D measurement device operable to acquire images and coordinates of forensic evidence.

A 3D imager is a portable device includes a projector that projects light patterns on the surface of an object to be scanned. Typically the projector emits a coded or uncoded pattern. One (or more) cameras, having a predetermined positions and alignment relative to the projector, which record images of the light pattern on the surface of an object. The three-dimensional coordinates of elements in the light pattern can be determined by trigonometric methods, such as by using epipolar geometry. Other types of noncontact devices may also be used to measure 3D coordinates, such as those that use time of flight techniques (e.g. laser trackers, laser scanners or time of flight cameras) for measuring the amount of time it takes for light to travel to the surface and return to the device.

Forensic light sources are used to detect materials not readily viewed by eye under visible light conditions. These light sources may be used by law enforcement for example to identify evidence at a crime scene. Typically, forensic light sources include a lamp that filters the light into individual color bands that enhance visualization of the materials through fluorescence, absorption and oblique lighting for example. The investigator may then document the evidence by collecting samples for later analysis and by taking 2D photographs of the area. It should be appreciated that the 2D photographs capture the relative positions between objects in the area being investigated. However, 2D photographs do not easily or reliably allow for direct measurement of distances after the fact. Further, forensic evidence may have a low contrast (e.g. a drop of blood on dark surface) and not visible in photographs that capture the overall area being investigated.

While existing 3D imagers and forensic light sources are suitable for their intended purpose the need for improvement remains, particularly in providing a system for acquiring the three-dimensional coordinates of the evidence and its location relative to the surroundings.

BRIEF DESCRIPTION

According to one aspect of the disclosure, a three-dimensional (3D) forensic evidence system is provided. The system includes a noncontact measurement device operable to measure a distance from the device to a surface. A first camera is operably coupled to the noncontact measurement device, the first camera having a field of view. A light source is operably coupled to the first camera and operable to emit light onto the surface within the field of view. A processor operably is coupled to the first camera, the processor operable to execute computer instructions when executed on the processor for determining 3D coordinates of at least one point in the field of view based at least in part on the distance, and assigning at least one color value to the at least one point in response to determining an interaction of a predefined wavelength of light with a substance in the field of view.

According to another aspect of the disclosure, a forensic three-dimensional (3D) imager is provided. The imager includes a projector operable to project a light pattern onto a surface. At least one first camera is coupled in a predetermined geometric relationship to the projector, the at least one first camera operable to acquire an image of the light pattern on the surface. At least one second camera is provided having a field of view that defines a first area on the surface. A light source is operable to emit light in a second area on the surface, the second area being within the field of view, the light being a predetermined wavelength. A processor is operably coupled to the at least one first camera and the at least one second camera, the processor operable to execute computer instructions when executed on the processor for determining 3D coordinates of at least one point in the second area based at least in part on the light pattern and the image, and assigning at least one color value to the at least one point in response to determining fluorescence or absorption of light in the second area.

According to yet another aspect of the disclosure, a method for determining the 3D coordinates of forensic evidence is provide. The method comprising: determining 3D coordinates of points on a surface; projecting a first light having a first predetermined wavelength onto a first area the surface; acquiring with at least one first camera a first image within in a field of view of the at least one first camera, the field of view overlapping the first area on the surface; determining an interaction of a predefined wavelength of light with a substance in the first area a portion of the first area based on the first image; identifying the 3D coordinates of at least one point in the portion of the first area based at least in part on the light pattern and the first image; and assigning a color value to the at least one point in response to the determining the interaction of the predefined wavelength of light with the substance in the first area.

According to yet another aspect of the disclosure, a method registering images with acquired 3D coordinates is provided. The method comprising: determining 3D coordinates of points on a surface; projecting a first light having a first predetermined wavelength onto a first area the surface; acquiring with at least one first camera a plurality of image within in a field of view of the at least one first camera, the field of view overlapping the first area on the surface; and registering the plurality of images based at least in part on the 3D coordinates.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the invention provide for a three-dimensional (3D) measurement device that acquires 3D coordinate data of evidence that fluoresce or absorb light of a predetermined wavelength. Embodiments provide for a system for adding the capability of forensic 3D coordinate data acquisition to a 3D imager. Embodiments provide for displaying the location of forensic evidence to an operator as an environment is being scanned.

Figure 1:
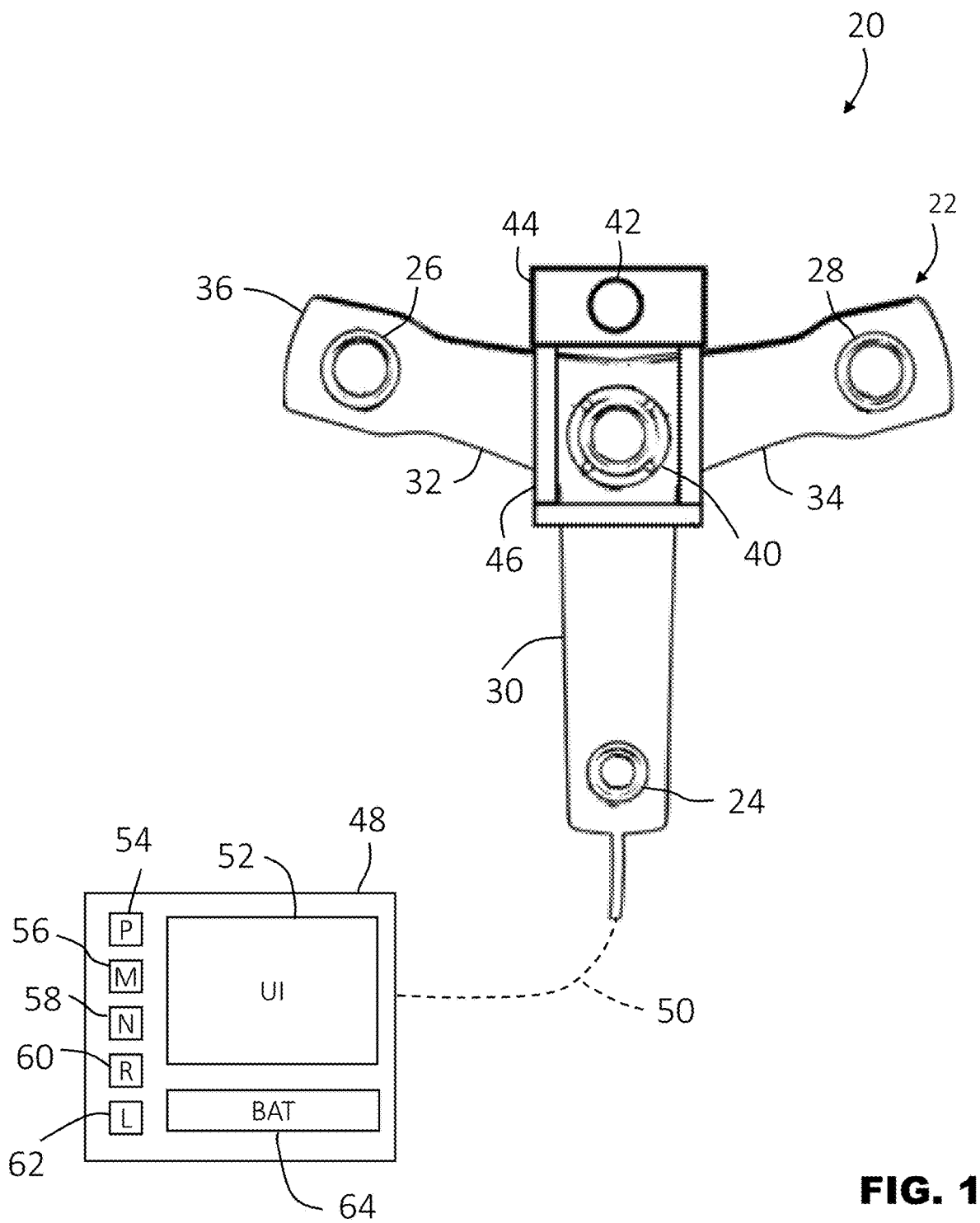
FIG. 1 is a view of a forensic 3D imager system in accordance with an embodiment of the invention.

Referring now to FIG. 1, a forensic 3D imager system 20 is shown for determining 3D coordinates of surfaces in an environment and the 3D coordinates of locations where forensic evidence may be found. As used herein, forensic evidence refers to materials that are visible, such as through fluorescence or absorption of light when exposed to light of a predetermined wavelength. Examples of forensic materials include, but are not limited to: hair, bone, teach, fingernails, bodily fluids, bite marks, bruises, gunshot residue, blood and muddy footprints.

The system 20 includes an image scanner 22 having a projector 24, a first camera 26 and a second camera 28. In the exemplary embodiment, the projector 24, and cameras 26, 28 are each disposed in a separate arm 30, 32, 34 of a housing 36 respectively. A color camera 40 is centrally disposed on the housing 36 between the arms 30, 32, 34. In the exemplary embodiment, the color camera 40 has a field of view that acquires images, including color information, of the environment being scanned. In an embodiment, the color camera 40 may be used to provide color (texture) information for incorporation into the 3D image. As discussed herein, the color camera 40 may also be used in some embodiments to acquire images of forensic evidence. In some embodiments, the camera 40 acquires a video image may be used to register multiple 3D images through the use of videogrammetry. The color camera 40 is sometimes referred to as an RGB camera.

Figure 13:
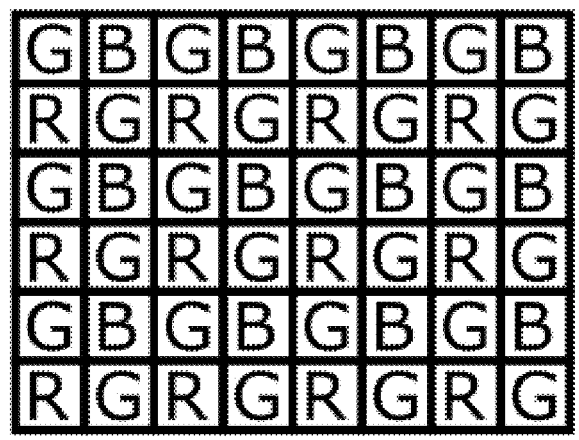
FIG. 13 is a prior art Bayer filter that may be used in accordance with an embodiment.

In the exemplary embodiment, the color camera 40 uses a Bayer filter. A Bayer filter is a filter disposed between the photosensitive array and the lens of the camera 40. A Bayer filter has two green pixels, one red pixel and one blue pixel per "superpixel" as shown in FIG. 13. As used herein, a superpixel is a 2×2 group of pixels. The individual pixels of the superpixel are sometimes referred to as sub-pixels. As discussed below with reference to FIGS. 14-16, other filters may be used on the color camera 40 that incorporate filters at the superpixel or sub-pixel level for determining the presence of forensic evidence.

As discussed in more detail herein, the projector 24 projects a pattern of light onto a surfaces in the environment. As used herein, the term "projector" is defined to generally refer to a device for producing a pattern. The generation of the pattern can take place by means of deflecting methods, such as generation by means of diffractive optical elements or micro-lenses (or single lasers), or by shading methods, for example the production by means of shutters, transparencies (as they would be used in a transparency projector) and other masks. The deflecting methods have the advantage of less light getting lost and consequently a higher intensity being available.

The cameras 26, 28 acquire images of the pattern and in some instances able to determine the 3D coordinates of points on the surface using trigonometric principles, e.g. epipolar geometry.

It should be appreciated that while the illustrated embodiments show and describe the device that determines 3D coordinates as being an image scanner, this is for exemplary purposes and the claimed invention should not be so limited. In other embodiments, devices that use other noncontact means for measuring 3D coordinates may also be used, such as a laser scanner device that uses time-of-flight to determine the distance to the surface.

The system 20 further includes a light source 42 that is operable to emit a light at a predetermined wavelength. The wavelength of light may have wavelengths of 400 nm, 415 nm, 455 nm, 515 nm, 532 nm, 555 nm, 575 nm, 600 nm, 630 nm or ultraviolet light for example. In an embodiment, the light source 42 is a laser light source, an LED light source or a fiber coupled laser diode for example. In some embodiments, the use of a fiber coupled laser diode may provide advantages, such as: a higher beam quality/increased homogeneous illumination; the cross-section of the beam may be shaped (e.g. a flat profile may be used for improved homogeneity); and multiple fiber coupled lasers may be combined. In an embodiment, where multiple fiber coupled lasers are combined, a multi-wavelength light source may be provided with a small size. In some embodiments, the light source 42 may include a filter or a plurality of interchangeable filters (such as on a rotating mechanical element). The filters selectively emit light at a predetermined wavelength. The filters may be automatically positioned by the system 20, or may be manually inserted by the operator.

In the embodiment of FIG. 1, the light source 42 is arranged in a housing 44. The housing 44 includes a frame 46 that couples the housing to the arms 30, 32, 34. In an embodiment, the frame 46 is removably coupled to the housing 36, allowing the operator to replace the light source 42 with a different light source that emits a different wavelength of light. This allows the operator to use the system 20 to scan for different forensic evidence that reacts to different wavelengths of light. In an embodiment, the light source 42 has a reduced angle of emittance relative to the 3D recording frame, including the projector 24 and cameras 26, 28, 40. This has the effect of delivering a suitable light power per area to the surface using a low-power light source. In an embodiment, the light source has 5 mW to 20 mW of power. As will be discussed in more detail herein, the area of light from light source 42 on the surface being scanned is smaller than the area defined by the field of view of the cameras 26, 28.

A controller 48 is coupled for communication to the projector 24, cameras 26, 28, 40 and light source 42. The connection may be a wired connection 50 or a wireless connection. The controller 48 is a suitable electronic device capable of accepting data and instructions, executing the instructions to process the data, and presenting the results. Controller 48 may accept instructions through user interface 52, or through other means such as but not limited to electronic data card, voice activation means, manually-operable selection and control means, radiated wavelength and electronic or electrical transfer.

Controller 48 uses signals act as input to various processes for controlling the system 20. The digital signals represent one or more system 20 data including but not limited to images acquired by cameras 26, 28, 40, temperature, ambient light levels, operator inputs via user interface 52 and the like.

Controller 48 is operably coupled with one or more components of system 20 by data transmission media 50. Data transmission media 50 includes, but is not limited to, twisted pair wiring, coaxial cable, and fiber optic cable. Data transmission media 50 also includes, but is not limited to, wireless, radio and infrared signal transmission systems. Controller 48 is configured to provide operating signals to these components and to receive data from these components via data transmission media 50.

In general, controller 48 accepts data from cameras 26, 28, 40, projector 24 and light source 42, and is given certain instructions for the purpose of determining the 3D coordinates of points on surfaces being scanned. The controller 48 may compare the operational parameters to predetermined variances and if the predetermined variance is exceeded, generates a signal that may be used to indicate an alarm to an operator or to a remote computer via a network. Additionally, the signal may initiate other control methods that adapt the operation of the system 20 such as changing the operational state of cameras 26, 28, 40, projector 24 or light source 42 to compensate for the out of variance operating parameter. Still other control methods may display, highlight in the display or otherwise notify the operator when forensic evidence is detected.

The data received from cameras 26, 28, 40 may be displayed on a user interface 52. The user interface 52 may be an LED (light-emitting diode) display, an LCD (liquid-crystal diode) display, a CRT (cathode ray tube) display, or the like. A keypad may also be coupled to the user interface for providing data input to controller 38. In an embodiment, the controller 48 displays in the user interface 52 a point cloud to visually represent the acquired 3D coordinates.

In addition to being coupled to one or more components within system 20, controller 48 may also be coupled to external computer networks such as a local area network (LAN) and the Internet. A LAN interconnects one or more remote computers, which are configured to communicate with controller 48 using a well-known computer communications protocol such as TCP/IP (Transmission Control Protocol/Internet(^) Protocol), RS-232, ModBus, and the like. Additional systems 20 may also be connected to LAN with the controllers 48 in each of these systems 20 being configured to send and receive data to and from remote computers and other systems 20. The LAN is connected to the Internet. This connection allows controller 48 to communicate with one or more remote computers connected to the Internet.

Controller 48 includes a processor 54 coupled to a random access memory (RAM) device 56, a non-volatile memory (NVM) device 58, a read-only memory (ROM) device 60, one or more input/output (I/O) controllers, and a LAN interface device 62 via a data communications bus.

Figure 12:
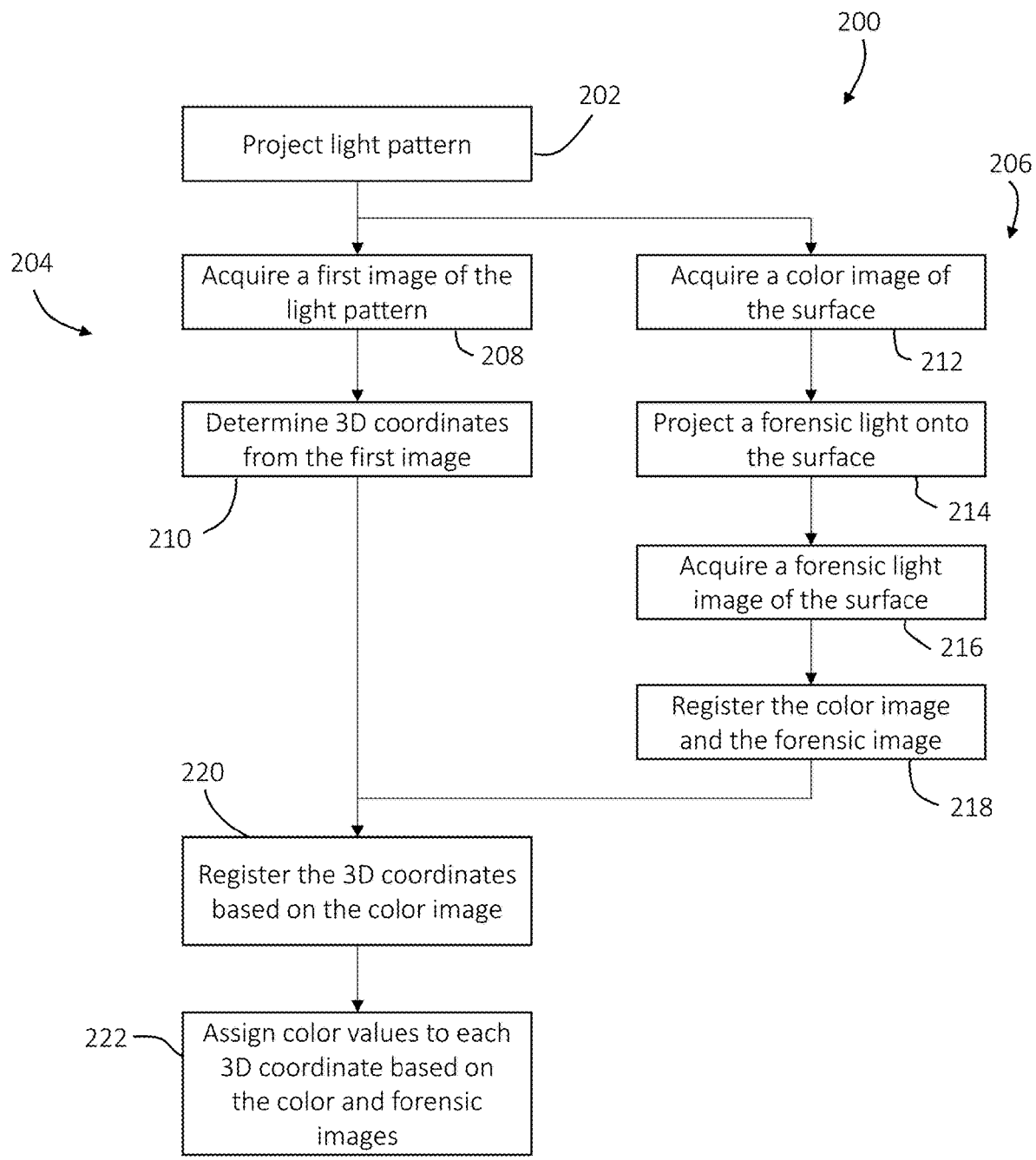
FIG. 12 is a flow diagram of a method of operating a forensic 3D imager.

LAN interface device 62 provides for communication between controller 48 and a network in a data communications protocol supported by the network. ROM device 60 stores an application code, e.g., main functionality firmware, including initializing parameters, and boot code, for processor 54. Application code also includes program instructions as shown in FIG. 12 for causing processor 54 to execute any system 20 operation control methods, including starting and stopping operation, changing operational states of projector 24 and light source 42, monitoring predetermined operating parameters, and generation of alarms. The application code creates an onboard telemetry system may be used to transmit operating information between the system 20 and one or more remote computers or receiving locations. The information to be exchanged remote computers and the controller 48 include but are not limited to 3D coordinate data and images or the detection of forensic evidence.

NVM device 58 is any form of non-volatile memory such as an EPROM (Erasable Programmable Read Only Memory) chip, a disk drive, or the like. Stored in NVM device 58 are various operational parameters for the application code. The various operational parameters can be input to NVM device 58 either locally, using a user interface 52 or remote computer, or remotely via the Internet using a remote computer. It will be recognized that application code can be stored in NVM device 58 rather than ROM device 60.

Controller 48 includes operation control methods embodied in application code such as that shown in FIG. 12. These methods are embodied in computer instructions written to be executed by processor 54, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, C#, Objective-C, Java, Javascript ALGOL (algorithmic language), BASIC (beginners all-purpose symbolic instruction code), visual BASIC, ActiveX, HTML (HyperText Markup Language), Python, Ruby and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

In an embodiment, the controller 48 further includes a battery 64. The battery 64 may be an electrochemical device that provides electrical power for the controller 48. In an embodiment, the battery 64 may also provide electrical power to the cameras 26, 28, 40, the projector 24 and the light source 42. In some embodiments, the battery 64 may be separate from the controller (e.g. a battery pack). In an embodiment, a second battery (not shown) may be disposed in the housing 36 to provide electrical power to the cameras 26, 28, 40 and projector 24. In still further embodiments, the light source 42 may have a separate energy source (e.g. a battery pack).

It should be appreciated that while the controller 48 is illustrated as being separate from the housing 36, this is for exemplary purposes and the claimed invention should not be so limited. In other embodiments, the controller 48 is integrated into the housing 36.

Figure 2:
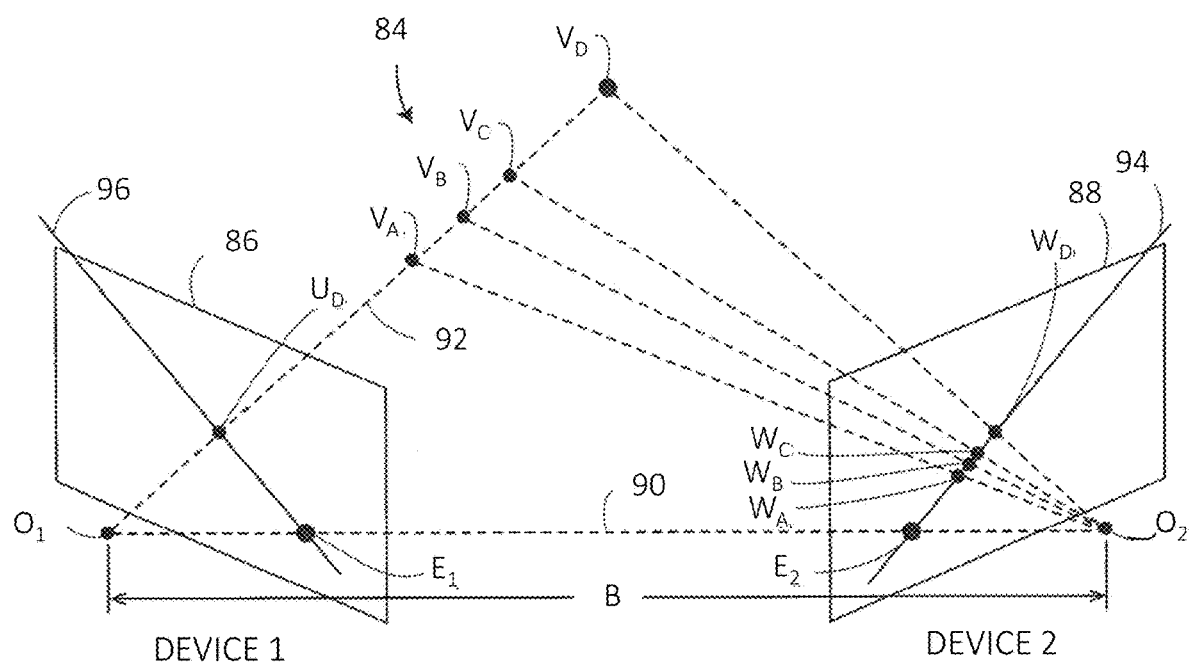
FIG. 2 and FIG. 3 are schematic illustrations of the principle of operation of the imager of FIG. 1.

In the illustrated embodiment, the projector 24 and cameras 26, 28 are arranged spaced apart in a triangular arrangement where the relative distances and positions between the components is known. The triangular arrangement is advantageous in providing information beyond that available for two cameras and a projector arranged in a straight line or from a system with a projector and a single camera. The additional information may be understood in reference to FIG. 2, which explain the concept of epipolar constraints, and FIG. 3 that explains how epipolar constraints are advantageously applied to the triangular arrangement of the system 20. In FIG. 2, a 3D triangulation instrument 84 includes a device 1 and a device 2 on the left and right sides as view from the viewpoint of FIG. 2, respectively. Device 1 and device 2 may be two cameras or device 1 and device 2 may be one camera and one projector. Each of the two devices, whether a camera or a projector, has a perspective center, $O_1$ and $O_2$, and a representative plane, 86 or 88. The perspective centers are separated by a baseline distance B, which is the length of the line 90. The perspective centers $O_1$, $O_2$ are points through which rays of light may be considered to travel, either to or from a point on a surface in the area of the environment being scanned. These rays of light either emerge from an illuminated projector pattern or impinge on a photosensitive array. The placement of the reference planes 86, 88 is applied in FIG. 2, which shows the reference planes 86, 88 between the object point and the perspective centers $O_1$, $O_2$.

In FIG. 2, for the reference plane 86 angled toward the perspective center $O_2$ and the reference plane 88 angled toward the perspective center $O_1$, a line 90 drawn between the perspective centers $O_1$ and $O_2$ crosses the planes 86 and 88 at the epipole points $E_1$, $E_2$, respectively. Consider a point $U_D$ on the plane 86. If device 1 is a camera, it is known that an object point that produces the point $U_D$ on the image lies on the line 92. The object point might be, for example, one of the points $V_A$, $V_B$, $V_C$, or $V_D$. These four object points correspond to the points $W_A$, $W_B$, $W_C$, $W_D$, respectively, on the reference plane 88 of device 2. This is true whether device 2 is a camera or a projector. It is also true that the four points lie on a straight line 94 in the plane 88. This line, which is the line of intersection of the reference plane 88 with the plane of $O_1$-$O_2$-$U_D$, is referred to as the epipolar line 92. It follows that any epipolar line on the reference plane 88 passes through the epipole $E_2$. Just as there is an epipolar line on the reference plane of device 2 for any point on the reference plane of device 1, there is also an epipolar line 96 on the reference plane of device 1 for any point on the reference plane of device 2.

Figure 3:
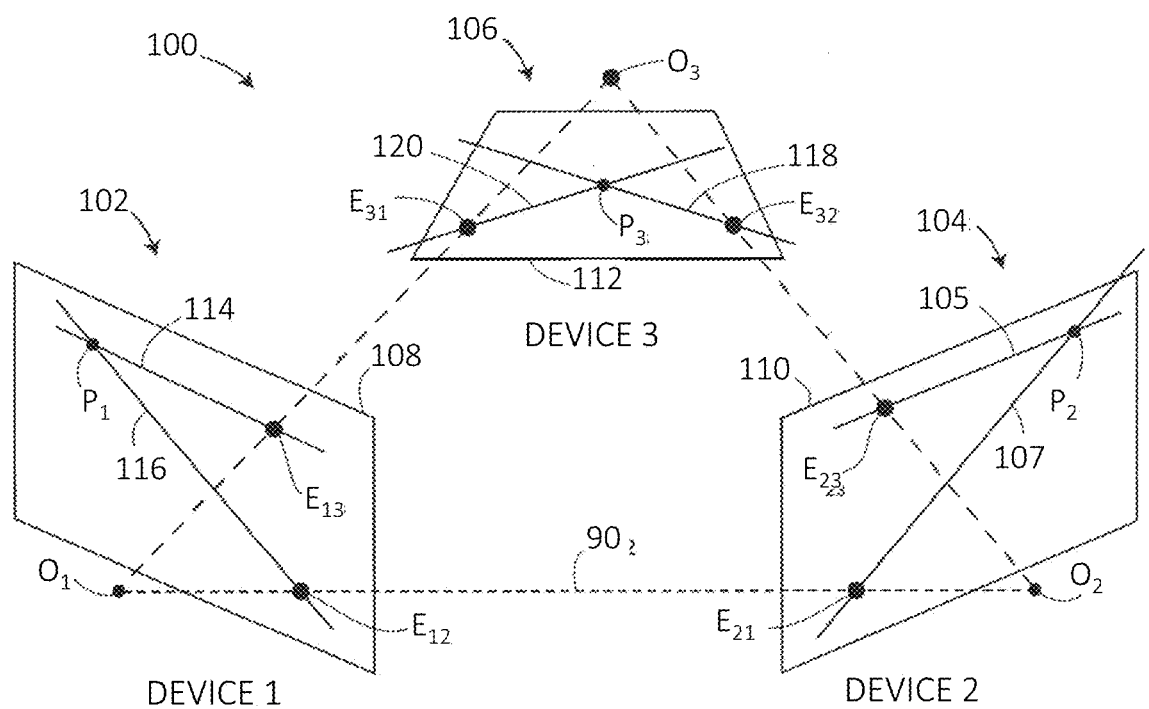

FIG. 3 illustrates the epipolar relationships for a 3D imager 100 corresponding to 3D imager 84 of FIG. 2 in which two cameras and one projector are arranged in a triangular pattern. In general, the device 1, device 2, and device 3 may be any combination of cameras and projectors as long as at least one of the devices is a camera. Each of the three devices 102, 104, 106 has a perspective center $O_1$, $O_2$, $O_3$, respectively, and a reference plane 108, 110, and 112, respectively. Each pair of devices has a pair of epipoles. Device 1 and device 2 have epipoles $E_{12}$, $E_{21}$ on the planes 108, 110, respectively. Device 1 and device 3 have epipoles $E_{13}$, $E_{31}$, respectively on the planes 108, 112, respectively. Device 2 and device 3 have epipoles $E_{23}$, $E_{32}$ on the planes 110, 112, respectively. In other words, each reference plane includes two epipoles. The reference plane for device 1 includes epipoles $E_{12}$ and $E_{13}$. The reference plane for device 2 includes epipoles $E_{21}$ and $E_{23}$. The reference plane for device 3 includes epipoles $E_{31}$ and $E_{32}$.

Consider the embodiment of FIG. 3 in which device 3 is a projector, device 1 is a first camera, and device 2 is a second camera. Suppose that a projection point $P_3$, a first image point $P_1$, and a second image point $P_2$ are obtained in a measurement. These results can be checked for consistency in the following way.

To check the consistency of the image point $P_1$, intersect the plane $P_3$-$E_{31}$-$E_{13}$ with the reference plane 108 to obtain the epipolar line 114. Intersect the plane $P_2$-$E_{21}$-$E_{12}$ to obtain the epipolar line 116. If the image point $P_1$ has been determined consistently, the observed image point $P_1$ will lie on the intersection of the determined epipolar line 114 and line 116.

To check the consistency of the image point $P_2$, intersect the plane $P_3$-$E_{32}$-$E_{23}$ with the reference plane 110 to obtain the epipolar line 105. Intersect the plane $P_1$-$E_{12}$-$E_{21}$ to obtain the epipolar line 107. If the image point $P_2$ has been determined consistently, the observed image point $P_2$ will lie on the intersection of the determined epipolar lines 107 and 105.

To check the consistency of the projection point $P_3$, intersect the plane $P_2$-$E_{23}$-$E_{32}$ with the reference plane 110 to obtain the epipolar line 118. Intersect the plane $P_1$-$E_{13}$-$E_{31}$ to obtain the epipolar line 120. If the projection point $P_3$ has been determined consistently, the projection point $P_3$ will lie on the intersection of the determined epipolar line 118 and line 120.

The redundancy of information provided by using a 3D imager 100 having a triangular arrangement of projector and cameras may be used to reduce measurement time, to identify errors, and to automatically update compensation/calibration parameters.

Figure 4:
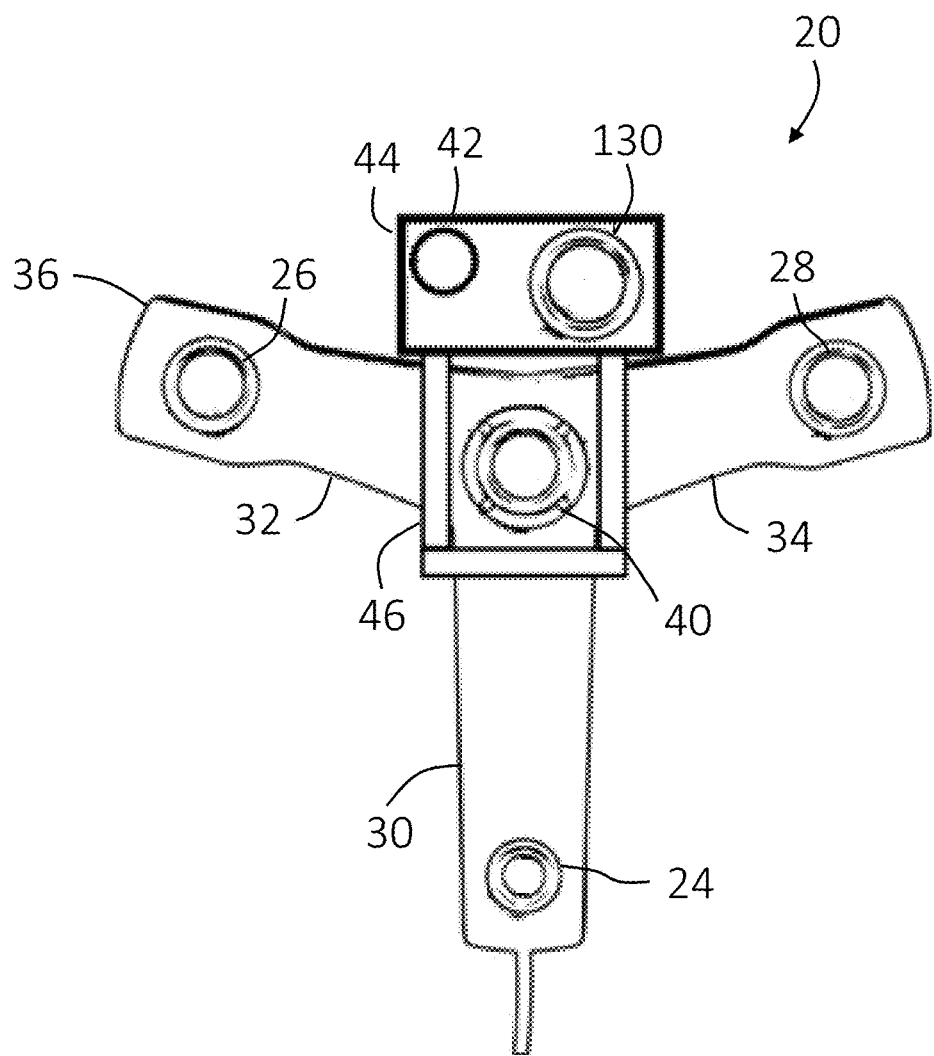
FIG. 4 is a view of a forensic 3D imager system in accordance with another embodiment of the invention.

Referring now to FIG. 4, another embodiment is shown of the system 20. In this embodiment, the housing 44 further includes a fourth camera 130. In this embodiment, the camera 130 may include a photo sensor that is sensitive to the wavelength of light emitted by light source 42. In still another embodiment, the photosensitive array of the camera 130 may be sensitive to a wavelength of light that is emitted by the forensic evidence. For example, some forensic evidence may be responsive to fluoresce light in the visible spectrum when irradiated by UV light. In still another embodiment, the camera 130 may include filters that are selectively arranged between the camera 130 and the area being scanned. The filters selectively filter or remove light at a predetermined wavelength from reaching the photo sensor. For example, where a forensic evidence fluoresces when irradiated by UV light, the filter may block the UV light from being imaged by the camera.

Figure 5:
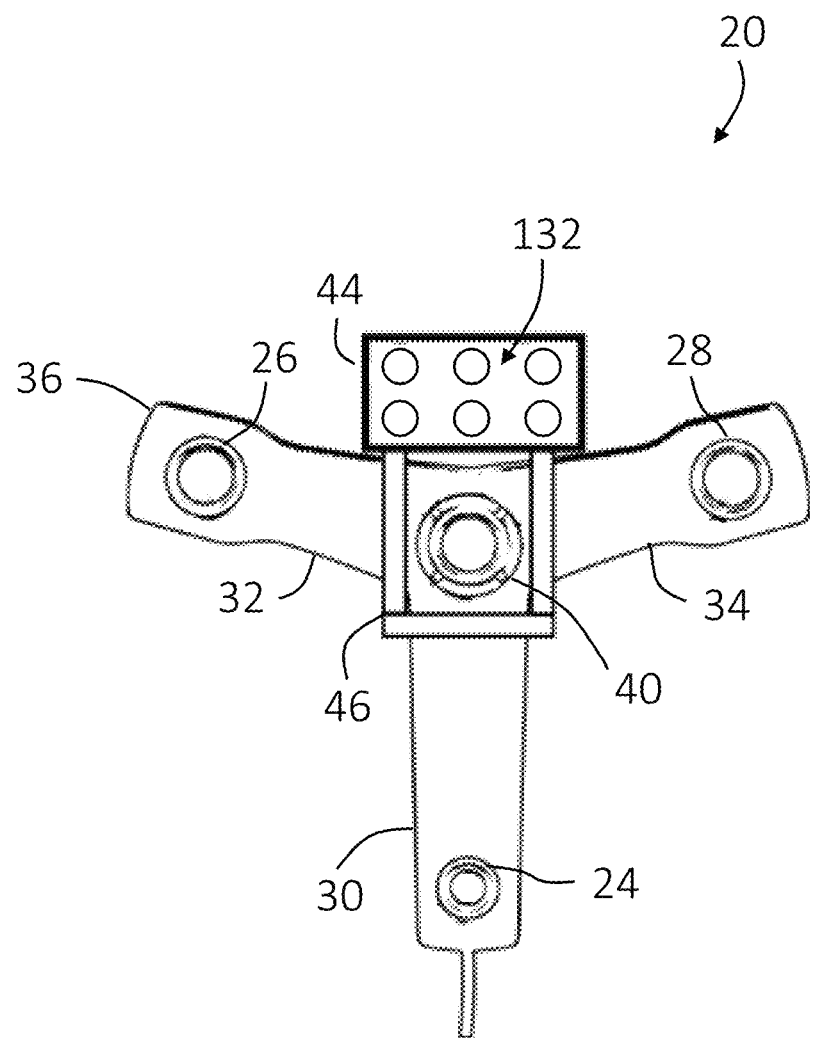
FIG. 5 is a view of a forensic 3D imager system in accordance with another embodiment of the invention.

Referring now to FIG. 5, another embodiment is shown of the system 20. In this embodiment, the housing 44 includes a plurality of light sources 132. Each of the light sources 132 is operational to selectively emit light having a predetermine wavelength, where each light source 132 emits light in a different wavelength. It should be appreciated that this allows the operator to scan for different types of forensic evidence without having to replace the housing 44. In an embodiment, a selector or actuator may be provided to allow the operator to selectively activate the light sources 132.

Figure 6:
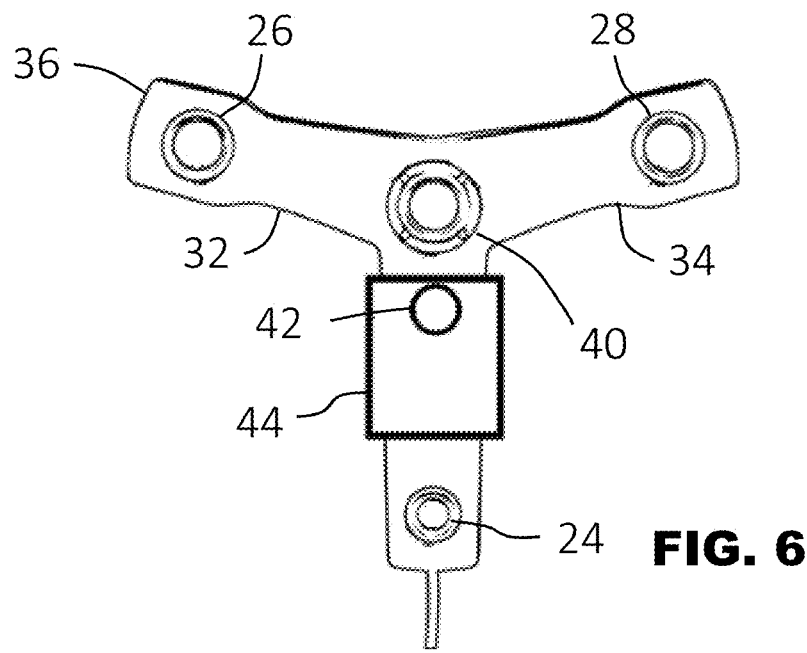
FIG. 6 and FIG. 7 are views of a forensic 3D imager system in accordance with another embodiment of the invention.
Figure 7:
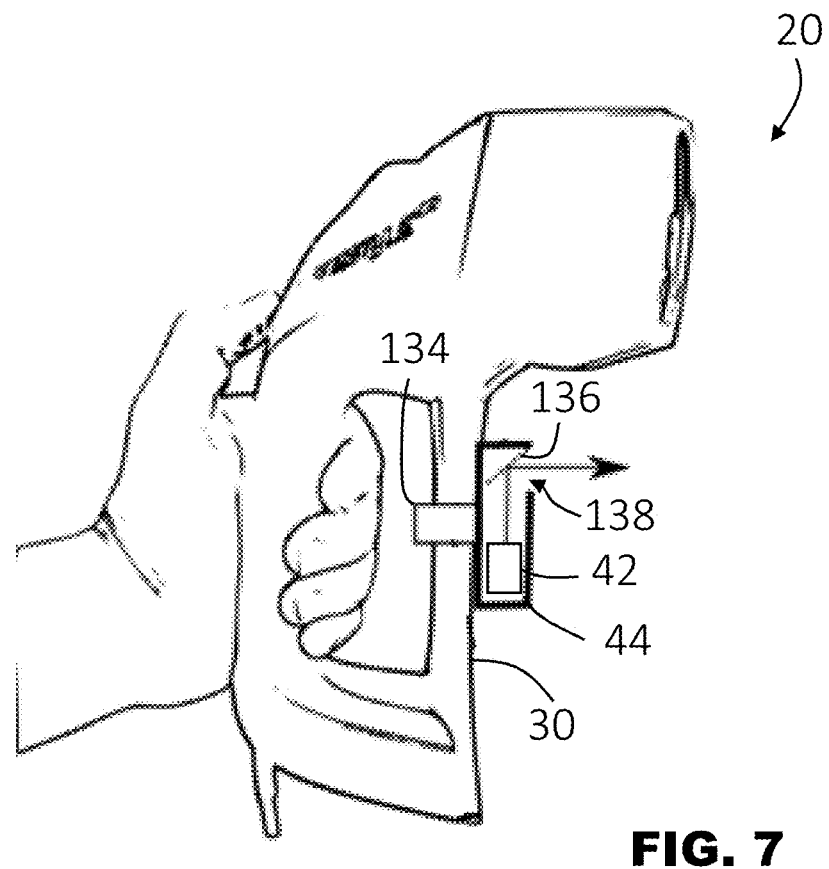

Referring now to FIG. 6 and FIG. 7, another embodiment is shown of the system 20. In this embodiment, the housing 44 is coupled to the arm 30 by a strap 134. The housing 44 in this embodiment has a profile that is long (height) and thin (thickness). The light source 42 is arranged to direct the light towards the end of the housing 44 where it is reflected by a reflective surface, such as a mirror 136. An aperture 138 is provided to allow the light from light source 44 to be emitted onto the surface being scanned.

Figure 8:
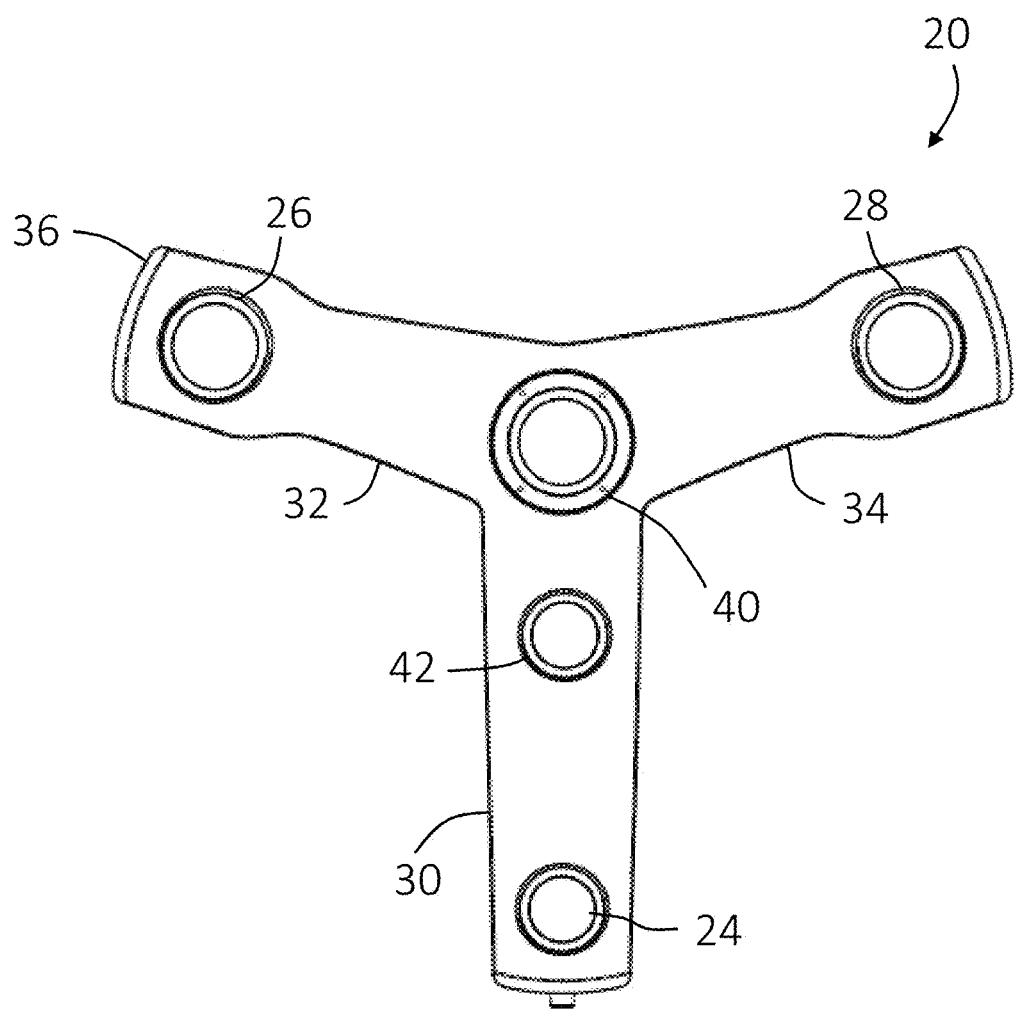
FIG. 8 is a view of a forensic 3D imager system in accordance with another embodiment of the invention.

Referring now to FIG. 8, another embodiment is shown of the system 20. In this embodiment, the light source 42 is integrated into the housing 36. In the illustrated embodiment, the light source 42 is disposed in the arm 30 between the color camera 40 and the projector 24. It should be appreciated that the light source 42 may also be positioned in one of the arms 32, 34. It should further be appreciated that multiple light sources 42 may be integrated into the housing 36.

It should be appreciated that while the embodiments of FIGS. 4-8 do not illustrate the controller 48, this is for clarity purposes and the controller 48 may be coupled for communication as described in reference to FIG. 1.

Figure 9:
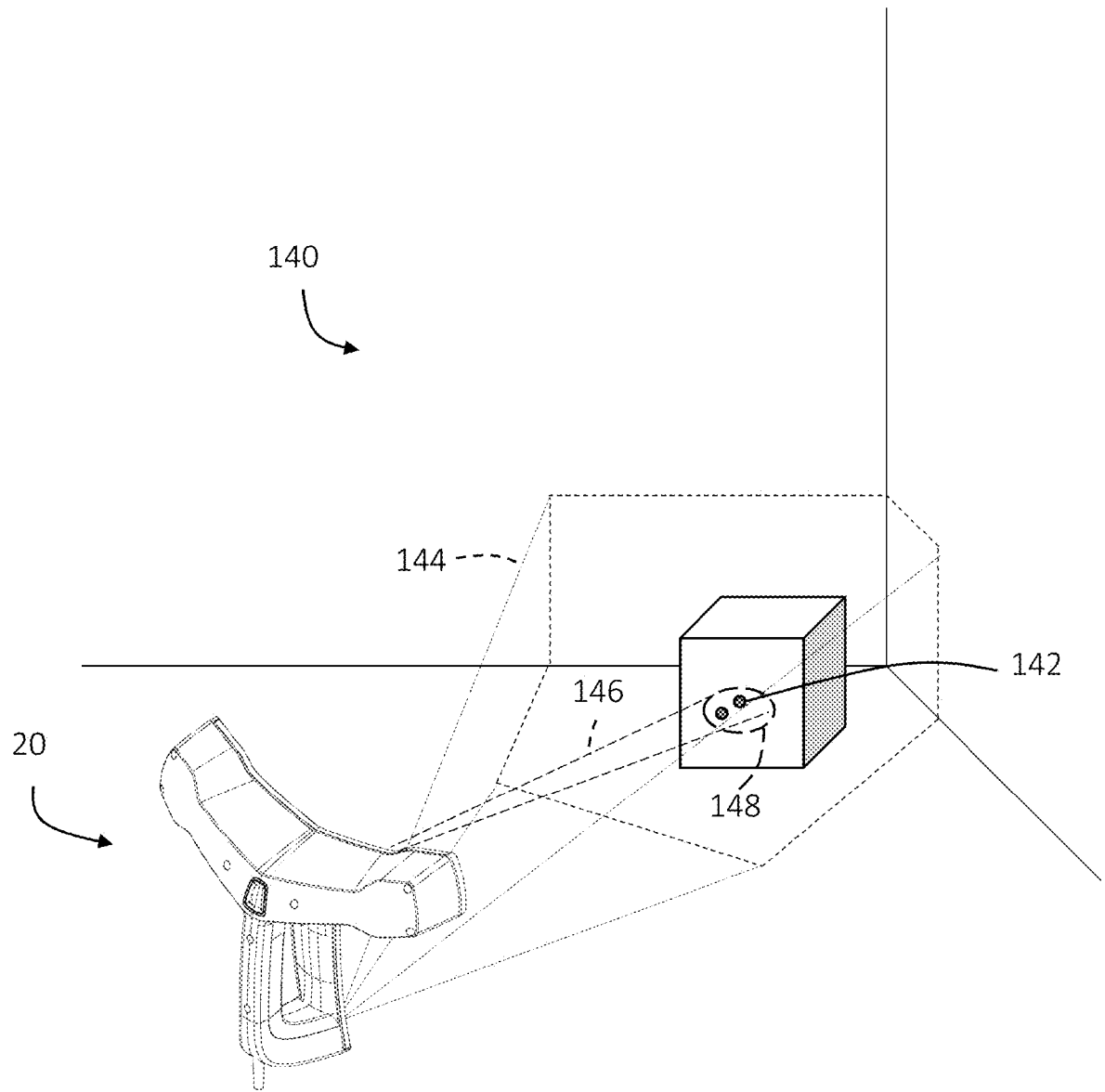
FIG. 9 is an illustration of a forensic 3D imager acquiring coordinates of an environment in accordance with an embodiment.

Referring now to FIG. 9, the operation of the system 20 will be described. In an embodiment, the system 20 is used to scan an environment 140 for forensic evidence, such as gun powder residue 142. It should be appreciated that the residue 142 is not normally visible to the unaided eye of the operator, but may be apparent when light having a 455 nm wavelength is directed onto the material. In operation, the projector 24 emits a pattern of light 144 onto surfaces within the environment 140. As discussed herein, the pattern of light 144 is reflected back from the surfaces and is acquired by the cameras 26, 28. Using trigonometric principals (such as those described with respect to FIG. 2 and FIG. 3 for example), the 3D coordinates of points of the surfaces in the environment 140 may be determined. These 3D coordinates of points may be then registered together and used to generate point cloud and computer models of the environment. It should be appreciated that the wavelength of light used in generate the pattern of light 144 is different from the wavelength of light emitted by the light source 42.

The light source 42 emits a light 146 at a predetermined wavelength (e.g. different from that of projector 24) that is appropriate for the forensic evidence being investigated. The light source 42 has a reduced emittance angle such that the area 148 illuminated by the light 146 is smaller than the field of view of the cameras 26, 28 (and therefore is also within the area illuminated by the pattern 144). In an embodiment, the light source 42 is configured to emit a light having an area having a radius of about 15 cm at a typical working distance from the system 20. It should be appreciated that when images of the material 142 are acquired, the 3D coordinates of the surface where forensic evidence 142 is located.

In some embodiments, the images of the area 148 are acquired by the color camera 40. In some embodiments, a filter may be disposed in front of the color camera 40 to allow the enhanced contrast of the forensic evidence to be imaged. In some embodiments, the filter may be performed by software, such as with controller 48 for example. As will be discussed in more detail herein, it may be desirable to also obtain color information of the environment 140. In these embodiments, the color camera 40 may alternate between acquiring color images and filtered images. For example, the camera 40 may acquire filtered images every other frame, with the remaining frames acquiring color images. In still other embodiments, the filtered images are acquired every fifth frame or tenth frame.

Figure 10:
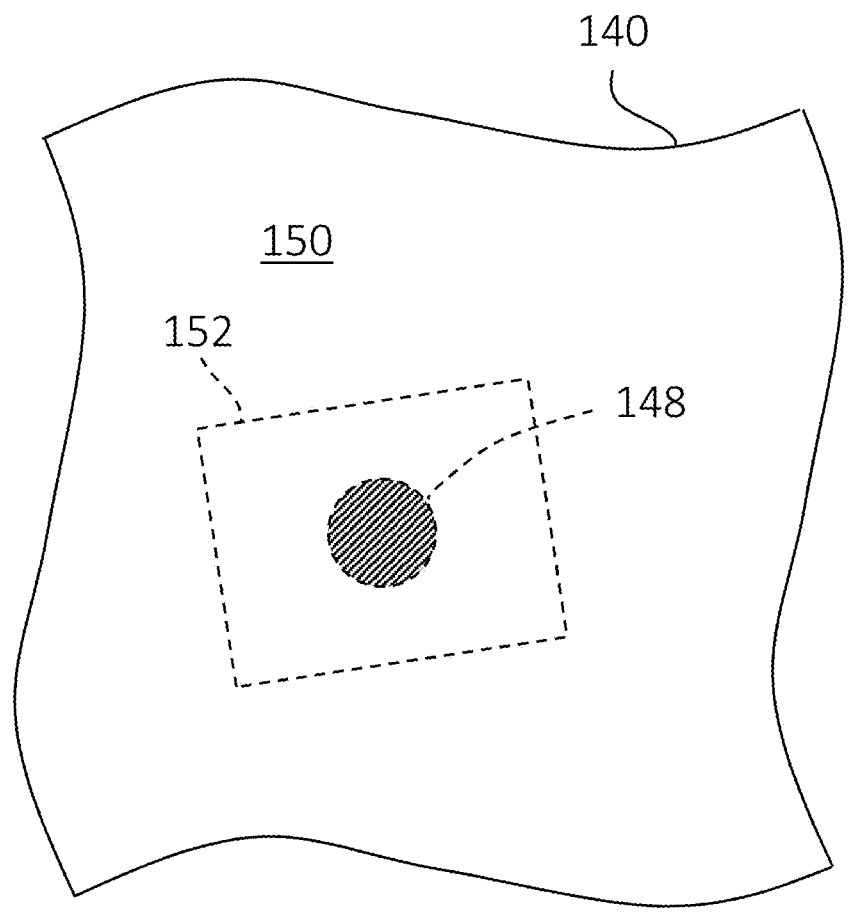
FIG. 10 is an illustration of a single camera frame of the forensic 3D imager of FIG. 9 in accordance with an embodiment.

FIG. 10 shows a simplified version of the areas on a surface imaged by the camera of system 20, such as color camera 40 or camera 130 (FIG. 4) for example. For explanatory purposes, the surface 150 is represented as a flat surface, so that the area 152 covered by the field of view of the camera 40, 130 is in the shape of a rectangle. It should be appreciated that when the surface is comprised of a shaped surface or multiple surfaces, the area 152 may have a more complex shape without deviating from the teachings disclosed herein. The light source 42 is configured to emit light such that the area 148 illuminated on the surface 150 is within the area 152 (and thus within the field of view of camera 40, 130). In the exemplary embodiment, the area 148 is centrally located within the area 152. Further, in the exemplary embodiment, the area 148 is circular and has a radius of 15 cm. As discussed herein, in an embodiment where the system 20 alternates acquiring (natural) color images with forensic color images, the area 152 and area 148 may be acquired in separate image frames and then combined or registered together.

Figure 11:
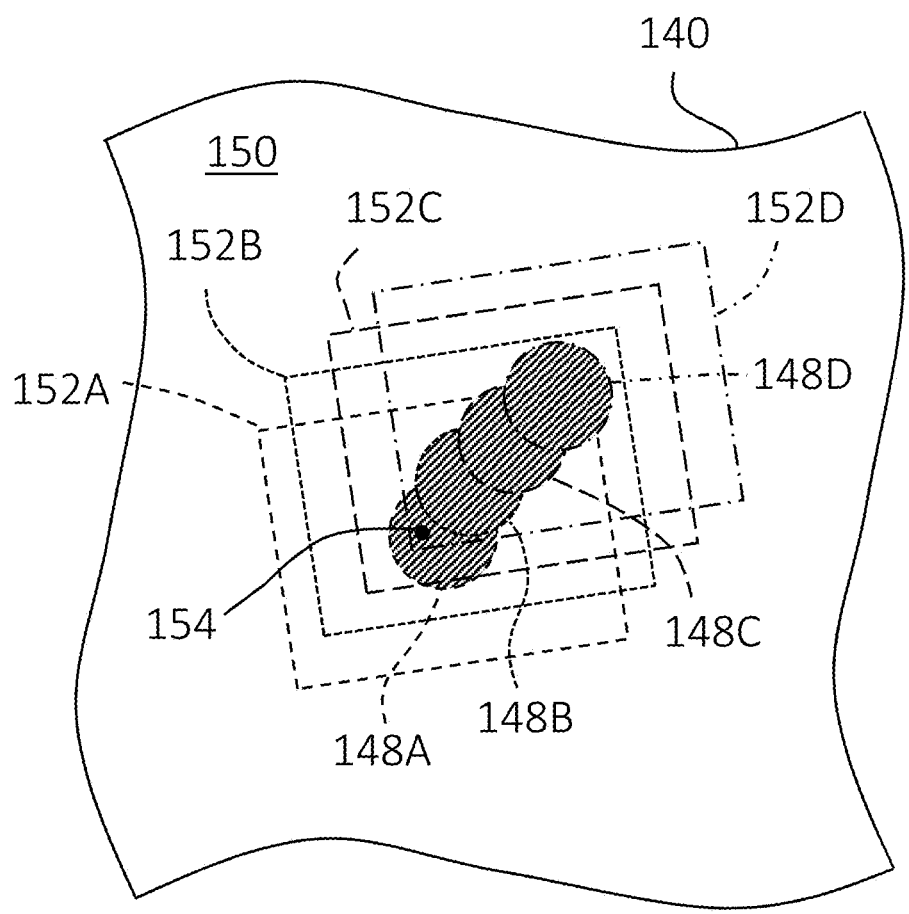
FIG. 11 is an illustration of a sequence of camera frames acquired by the forensic 3D imager of FIG. 9 in accordance with an embodiment.

FIG. 11 illustrates a plurality of color image frames of areas 152A-152D and forensic color image frames 148A-148D that area acquired sequentially by cameras 40, 130 as the system 20 is moved relative to the surface 150. It should be appreciated that the colors imaged from areas 152A-152D and areas 148A-148D may be registered together with the 3D coordinate data. This allows the color to be mapped to the 3D coordinate. Thus each point in a point cloud generated from the 3D coordinates acquired by the projection of a pattern of light by the projector 24 and imaged by the cameras 26, 28 will have at least one associated color value that is determined from the colors imaged in areas 152A-152D. Further, for points of the point cloud that are positioned where the forensic light source 42 illuminates the surface (e.g. points that lie within areas 148A-148D) may have a color value associated with forensic evidence, such as from fluorescence or absorption caused by the light emitted by the light source 42.

Thus, for at least some of the points in the point cloud, there may be two color values associated with a point where the point is imaged both as part of the areas 152A-152D and the areas 148A-148D. For example, if forensic evidence is within the area 148A at point 154, the point 154 is first imaged (frame 1) to obtain the natural/ambient color of the surface (texture). The point 154 is next imaged (frame 2) under the forensic light 146 from light source 42. If the point 154 is the location of evidence that fluoresces or absorbs light 146, then the points in the point cloud associated with the position (in real space) of point 154 will have two color values associated therewith.

It should be appreciated that while embodiments herein describe the acquisition of images for areas 152, 148 as being separate or discrete, this is for exemplary purposes and the claimed invention should not be so limited. In some embodiments, the color images acquired by color camera 40 are used to register the image frames and/or the 3D coordinates relative to each other. In this way, 3D coordinates acquired in different image frames may be combined together into a single model or representation of the surface. Where the area 148 is small relative to the area 152 so that the forensic light illuminated area 148 does not interfere with this registration process, the images of area 148 and area 152 may be acquired in a single frame (e.g. simultaneously). In one embodiment, the color from forensic light 146 may be separated from the natural/ambient color in post processing, such as through the use of a color histogram for example.

In an embodiment where the natural/ambient color and the forensic color are acquired in the same image frame, a particular location will be imaged multiple times, thus allowing both color values to be determined. For example, the point 154 is initially imaged (frame 1) in area 148A to obtain the forensic light color. As the system 20 is moved, the point 154 will be positioned in the area 152B (frame 2) outside of the forensic light of area 148B to obtain the natural/ambient color. Similarly, as additional images are acquired, the natural/ambient color will be acquired (frame 3 and frame 4) since it will be positioned within area 152C and area 152D. By separating colors (e.g. a via a color histogram analysis), the location of forensic evidence may be identified. In other embodiments, the point of view between area 148A and area 152C/152D is about equal (in space and time) and therefore the color information may also be assumed to be equal.

It should be appreciated that this process provides advantages in allowing for the operator to generate a point cloud and 3D model of the environment 140 and have the 3D coordinates of forensic evidence (e.g. points in the point cloud with two color values). The ability associate multiple color values with a location (e.g. a point in the point cloud) has advantages in allowing small/trace evidence samples to be better emphasized or visually enhanced relative to a single color value configuration. Further, advantages may be gained by displaying the point cloud on display 52 which would allow the operator to visually see in real-time (or substantially real-time) the presence of forensic evidence. By alerting the operator to the location of the evidence, additional investigations may be performed before the environment is disturbed or contaminated.

Referring now to FIG. 12, a method 200 is shown for operating the system 20. The method 200 starts in block 202 where the light pattern is projected onto at least one surface in the environment being scanned for forensic evidence. In an embodiment, the method 200 may then bifurcate into two parallel processes 204, 206. It should be appreciated that while embodiments herein describe the steps of method 200 in a particular order, this is for exemplary purposes and the steps of method 200 may be performed serially/sequentially or in parallel.

The first process 204 begins by acquiring a first image of the light pattern on the surface in the environment in block 208. The method 200 then proceeds to block 210 where 3D coordinates of points on the surface are determined based at least in part on the first image and the light pattern, such as via trigonometric principles and epipolar geometry as described herein with reference to FIG. 2 and FIG. 3 for example, or using time-of-flight techniques.

The second process 206 begins by acquiring a natural/ambient color image of the surface in block 212 such as with the color camera 40 for example. It should be appreciated that natural/ambient color image overlaps with the area of the surface that the light pattern is projected. The method 200 then proceeds to block 214 where the forensic light is projected onto the surface, such as with light source 42 for example. In one embodiment, the forensic light is projected within field of view of the color camera 40. The method 200 then proceeds to block 216 where a forensic image of the surface illuminated by the forensic light is acquired. In an embodiment having two cameras (e.g. camera 40 and camera 130), it should be appreciated that the color image of block 212 and the forensic image of block 216 may be acquired simultaneously. Further, as described herein, in some embodiments, the forensic light and the natural ambient color may be acquired in a single image. In embodiments where separate color images and forensic images are acquired, these images are registered together in block 218.

The method 200 then proceeds to block 220 where the 3D coordinates are registered to each other. In the exemplary embodiment, the registration is performed using the images acquired by the color camera 40, such as by natural feature recognition for example. In other embodiments, the registration may be performed using photogrammetric markers. With the 3D coordinates registered into a common frame of reference, the color values from the color images (of block 212) and the forensic images (of block 216) are assigned to the 3D coordinates in block 222. In other words, each of the points in a point cloud generated from the 3D coordinates may have a plurality values associated therewith, these values may include position values (x, y, z) relative to a common frame of reference, a first color value representing the natural/ambient color of that location (in real space), and a second color representing the fluorescence or absorption of that location (in real space) under the forensic light.

In embodiments where the wavelength of the forensic light is selectable by the operator (e.g. FIG. 5), information on the wavelength of light and any filter that is used may also be associated with each point.

It should be appreciated that while embodiments herein describe the scanning with a single wavelength of forensic light, this is for exemplary purposes and the claimed invention should not be so limited. In other embodiments (e.g. FIG. 5), multiple forensic light sources may be used either simultaneously or serially to identify different types of forensic evidence. For example, a light source having a wavelength of 455 nm and a light source having a wavelength in the ultraviolet band (190-400 nm) may be used (simultaneously or serially) to identify gun powder residue and blood. It should be appreciated that in an embodiment that uses filters to change the wavelength of light emitted, a single light source may be used to identify different forensic evidence types by changing the filter in a serial manner.

While the embodiments described herein describe the mapping or registration of colors from the images acquired by the camera 40 to the points in the point cloud, in other embodiments the point cloud may be used to register the images of forensic evidence. It should be appreciated that the resolution (e.g. in terms of pixels) of the camera 40 may be higher than that of the point cloud (e.g. the density of points). Thus, by using the point cloud to register the images, a composite image having high resolution of the environment may be generated that includes forensic evidence. Further, the system may enhance, highlight or emphasize the forensic evidence in the composite image to make it visible to the operator. In an embodiment, a system and method for forming a composite image is provided. The method includes determining 3D coordinates of points on a surface. A first light is projected having a first predetermined wavelength onto a first area the surface. The first camera acquires a plurality of image within in a field of view of the first camera, the field of view overlapping the first area on the surface. The plurality of images are registered based at least in part on the 3D coordinates.

In still another embodiments, the point cloud may be used to define a mesh through triangulation. In triangulation, a net of polygons or triangles are defined between the points of the point cloud to generate a representation of the surface. In this embodiment, the images acquired by camera 40 of the forensic evidence may be mapped onto the polygon surfaces to provide a texture to the surface.

Figure 14:
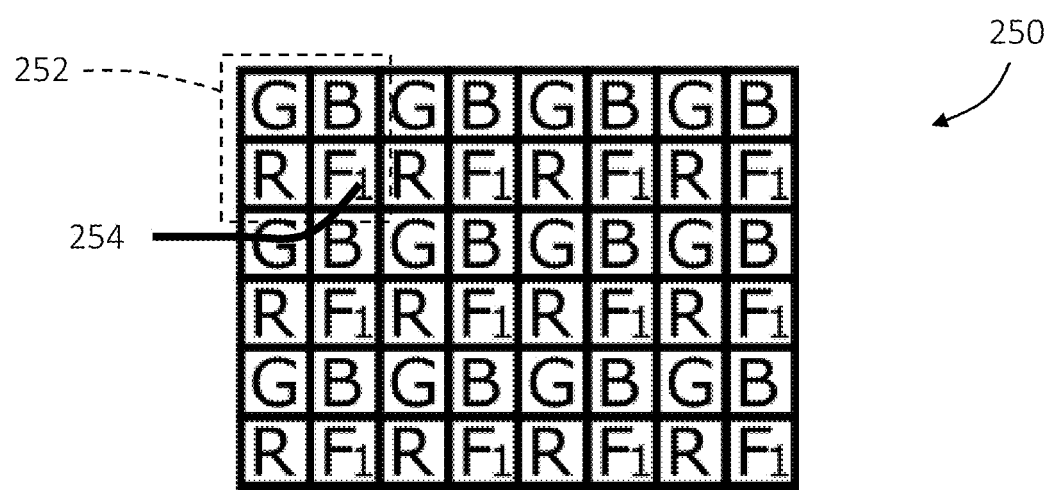
FIGS. 14-16 are schematic view of color camera filters incorporating forensic filter elements in accordance with an embodiment.

Referring now to FIG. 14, another embodiment is shown of a filter that is disposed in front of the photosensitive array of the color camera 40 in place of the standard Bayer filter. A Bayer filter, shown in FIG. 13, is a standard filter used in color cameras as it is more sensitive to green light and is believed to mimic the physiology of the human eye. In the embodiment of FIG. 14, a filter 250 is provided in which one of the green pixels in each superpixel 252 is replaced with a forensic filter element 254 or "$F_1$". The forensic filter 254 is a pixel level filter that is responsive to a predetermined wavelength of light that corresponds to a wavelength that activates an optical response from material of forensic interest, such as blood or gun powder residue for example. The forensic filter 254 cooperates with and is matched with the forensic light source. During operation, when the forensic light source emits light that is reflected by the forensic evidence material, the reflected light will be imaged by the pixel on the color camera associated with the forensic filter 254. It should be appreciated that changing the filter in the camera provides advantages in integrating the forensic detection into the color camera while also allowing the color camera to perform tracking and point cloud colorization.

Figure 15:
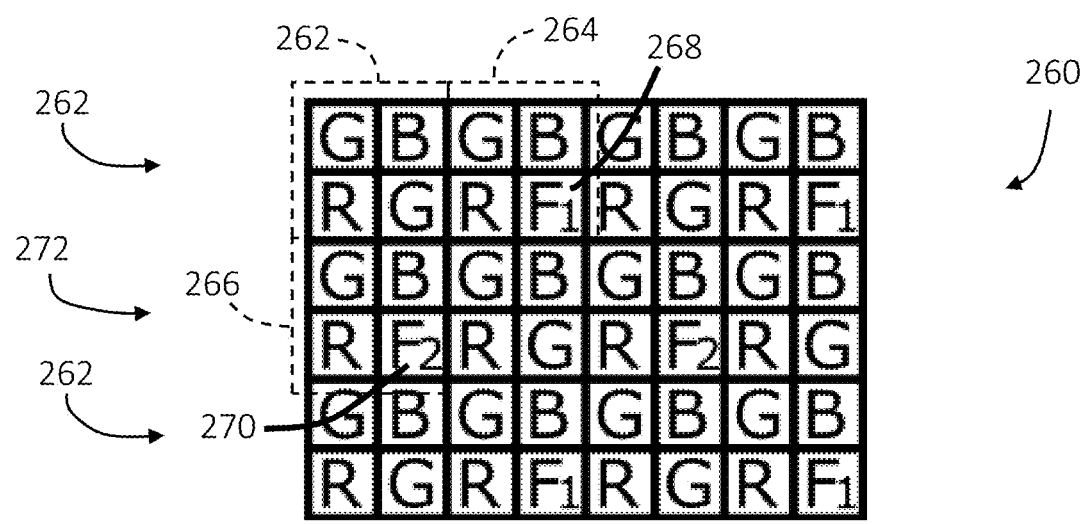

Referring now to FIG. 15, another embodiment is shown of a filter 260 incorporated into the color camera 40 and disposed between the photosensitive array and the camera lens. Similar to the embodiment of FIG. 14, the filter 260 is used in place of the Bayer filter. In this embodiment, each row 262, 272 of superpixels alternates between a Bayer superpixel 262 (e.g. two green, one red, one blue pixel) and a superpixel 264, 266 which include a sub-pixel with a forensic filter elements 268, 270. In this embodiment, the forensic filter 268 or "F1" is responsive or sensitive to a first wavelength of light and the forensic filter 270 is responsive or sensitive to a second wavelength of light. As should be appreciated, the filters 268, 270 are responsive to two different wavelengths of light at which forensic evidence may be detected. In an embodiment, the rows 262, 272 alternate which forensic filter 268, 270 is incorporated into the respective row. In the illustrated embodiment, the row 262 has superpixels 264 having the forensic filter 268 and row 272 has superpixels 266 having the forensic filter 270.

In operation, the operator emits light from the forensic light source (either simultaneously or serially) while scanning an area of interest. When forensic evidence is present, the light reflected by forensic evidence may be acquired by either pixels $F_1$ or pixels $F_2$. Simultaneously with the acquisition of the light acquired by the pixels $F_1$ or pixels $F_2$, the color camera 40 also acquires color images for tracking and colorization of the point cloud. It should be appreciated that provides advantages in integrating the forensic detection for multiple types of evidence into the color camera while also allowing the color camera to perform tracking and point cloud colorization.

Figure 16:
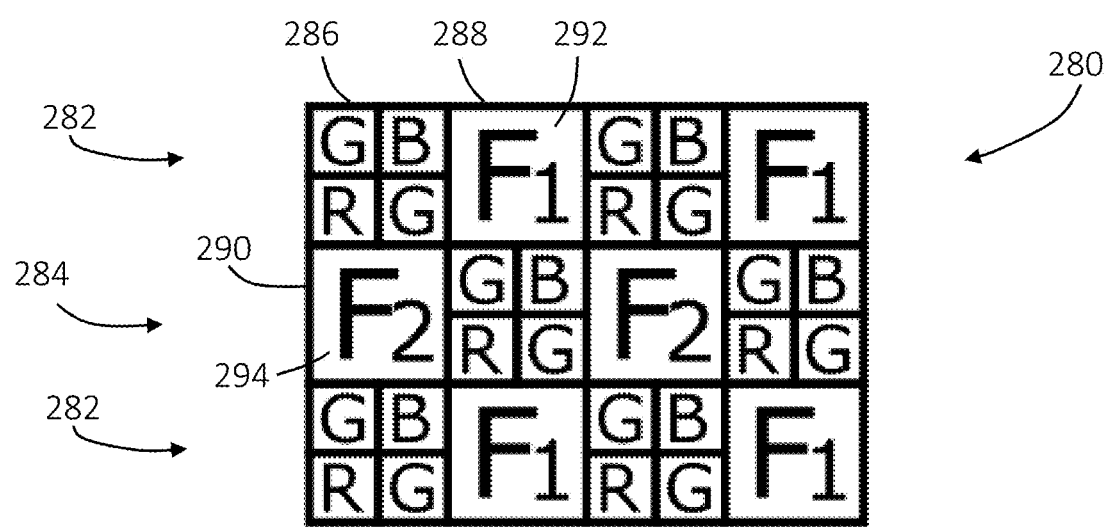

Referring now to FIG. 16, another embodiment is shown of a filter 280 incorporated into the color camera 40 and disposed between the photosensitive array and the camera lens. Similar to the embodiment of FIG. 14 and FIG. 15, the filter 280 is used in place of the Bayer filter. In this embodiment, each row 282, 284 of superpixels alternates between a Bayer superpixel 286 and a superpixel 288, 290 that includes a forensic filter elements 292, 294. The color camera 40 with the filter 280 operates in a similar manner to filter 260 of FIG. 15 except that instead of having the forensic filter 292, 294 aligned with and associated with a sub-pixel, the forensic filter 292, 294 is aligned with and associated with a respective superpixel (e.g. four sub-pixels). It should be appreciated that the filter 280 provides advantages in increasing the sensitivity of the scanner 20 to detecting the presence of forensic evidence.

It should be appreciated that while the scanner 20 of the embodiments of FIGS. 14-16 is described as having one of the filters 250, 260, 280, this is for exemplary purposes and the claims should not be so limited. In other embodiments, the filters 250, 260, 280 may be combined, such as by alternating Bayer superpixels with filters associated with subpixels (FIG. 14, FIG. 15) and filters associated with superpixels (FIG. 16) for example. In still other embodiments, additional forensic filter elements, such as a third, fourth or fifth filter element for example, may be included in the filters 250, 260, 280, where each of the additional filter elements is responsive to a different wavelength of light that is associated with forensic evidence.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A three-dimensional (3D) forensic evidence system comprising:
   a noncontact measurement device operable to measure a distance from the device to a surface;
   a first camera operably coupled to the noncontact measurement device, the first camera having a field of view, the first camera captures a first image of the field of view, the first image comprising representation of colors of points in the field of view based on ambient light;
   a forensic light source operable to emit light onto the surface within the field of view;
   a second camera operably coupled to the forensic light source, the second camera captures a second image of the field of view, the second image comprising representation of one or more forensic evidence points in the field of view, a forensic evidence point having a particular substance that interacts with the light emitted by the forensic light;
   a projector operable to provide a light pattern onto a surface;
   a third camera coupled in a predetermined geometric relationship to the projector;
   a fourth camera that is associated with a filter to remove the light emitted by the forensic light from reaching the fourth camera, the fourth camera captures a fourth image of the field of view; and a processor operably coupled to the first camera, the second camera, the third camera, and the fourth camera, wherein the processor is operable to execute computer instructions, which when executed on the processor cause the processor to:

register the first image captured by the first camera;

register the second image, the third image, and the fourth image in a common frame of reference of the first image;

determine 3D coordinates of a point in the field of view based at least in part on the distance, the light pattern on the surface captured in the first image, and the light pattern on the surface captured in a third image that is acquired by the third camera;

register the 3D coordinates of said point into the common frame of reference based on the first image, the second image, and the third image;

assign a first color value to the 3D coordinates of said point based on the first image captured by the first camera;

assign a second color value to the 3D coordinates of said point based on the at least one point being a forensic evidence point that is captured in the fourth image; and store both, the first color value and the second color value, in association with the 3D coordinates of said one single point.

2. The system of claim 1 wherein the device is operable to determine the distance based at least in part on a time-of-flight of light emitted by the device.

3. The system of claim 1 wherein the first image is acquired by the first camera at a first predetermined frequency, which is distinct from a second predetermined frequency at which the fourth camera acquires the fourth image.

4. The system of claim 1 wherein the first camera and the fourth camera acquire the first image and the fourth image substantially simultaneously.

5. The system of claim 1 wherein the projector is operable to emit the light pattern at a wavelength that is different than light emitted by the forensic light source.

6. The system of claim 1 wherein the forensic light source is operable to emit the light within an area, the area being smaller than the field of view.

7. The system of claim 1, wherein the interaction of the predefined wavelength of light with the substance is an absorption, a fluorescence, or a scattering of light.

8. The system of claim 1, wherein the fourth camera includes a lens, a photosensitive array and a filter disposed between the lens and the photosensitive array, the photosensitive array having a plurality of superpixels, each of the superpixels including a plurality of sub-pixels, the filter having a plurality of filter elements, each filter element associated with at least on sub-pixel, wherein at least one of the plurality of filter elements is responsive to a predetermined wavelength of the light emitted by the forensic light source.

9. The system of claim 8, wherein the at least one of the plurality of filter elements is associated with a plurality of sub-pixels.

10. The system of claim 8, wherein the at least one of the plurality of filter elements includes a first filter element and a second filter element, the first filter element is responsive to the predetermined wavelength and the second filter element is responsive to a second predetermined wavelength.

11. A forensic three-dimensional (3D) imager comprising:
a projector operable to project a light pattern onto a surface;

a first camera, a second camera, and a third camera, which are coupled in a predetermined geometric relationship to the projector, the first camera is operable to acquire a first image of the light pattern on the surface, the second camera is operable to acquire a second image of the light pattern on the surface, and the third camera is operable to acquire a third image of the light pattern on the surface, wherein c combination of the fields of view of the first camera, the second camera, and the third camera defines a first area on the surface;

a light source operable to emit light in a second area on the surface, the second area being within the first area, the light being a predetermined wavelength;

a fourth camera that is associated with a filter to remove the light emitted by the light source from reaching the fourth camera, the fourth camera highlights one or more forensic evidence points in the second area, a forensic evidence point having a particular substance that the light emitted by the forensic light identifies based on fluorescence or absorption; and a processor operably coupled to the at least one first camera the second camera, the third camera, and the fourth camera, the processor operable to execute computer instructions, which when executed on the processor cause the processor to:

determine 3D coordinates of a point in the second area based at least in part on the light pattern on the surface captured in the first image, and the light pattern on the surface captured in a third image that is acquired by the third camera, assign a first color value to said point based on ambient light, assign a second color value to said point based on determining that the at least one point is a forensic evidence point, map the first color value and the second color value to a 3D coordinate of said point to identify the forensic evidence point at time of rendering, and store both, the first color value and the second color value, in association with the 3D coordinate of said one single point.

12. The imager of claim 11, wherein the fluorescence or absorption of light is determined from a fourth image acquired by the fourth camera.

13. The imager of claim 11, further comprising a display having a user interface operably coupled to the processor, wherein the processor is further operable to display the fluorescence or absorption of light on the display.

14. The imager of claim 11, further comprising a plurality of filters movably disposed between the four camera and the second area, each of the plurality of filters operable to filter a predetermined bandwidth of light.

15. The imager of claim 11, wherein:
the at least one point is located in the second area in the first image; and
the at least one point is located in the first area and outside of the second area in the fourth image.

16. The imager of claim 11, wherein the light source includes a plurality of light sources, each of the plurality of light sources operable to emit a light at a different wavelength.

17. A method comprising:
determining 3D coordinates of points on a surface;
projecting a first light having a first predetermined wavelength onto a first area the surface;

acquiring with a first camera a first image within a field of view of the first camera, the field of view overlapping the first area on the surface;

acquiring with a second camera a second image within a second field of view of the second camera, the second field of view overlapping the first area on the surface;

acquiring with a third camera a third image within a third field of view of the third camera, the third field of view overlapping the first area on the surface;

acquiring with a fourth camera a fourth image within a fourth field of view of the fourth camera, the fourth field of view overlapping the first area on the surface;

determining an interaction of a predefined wavelength of light with a substance in the first area based on the fourth image;

identifying the 3D coordinates of said point in the portion of the first area based at least in part on the light pattern on the surface captured in the first image, the second image, and the third image;

assigning a first color value to said point based on ambient light;

assigning a second color value to said point in response to the determining the interaction of the predefined wavelength of light with the substance in the first area; and storing both, the first color value and the second color value, in association with said one single point.

18. The method of claim 17 wherein the determination of the 3D coordinates is based at least in part on a time-of-flight of light.

19. The method of claim 17, wherein the first image, the second image, and the third image, are acquired on a periodic basis.

20. The method of claim 19, wherein the first camera:
acquires images at a predetermined frame rate; and
acquires the first image on a predetermined periodic basis.

21. The method of claim 20 wherein the predetermined periodic basis is one every other frame.

22. The method of claim 20 wherein the predetermined periodic basis is every fifth frame.

23. The method of claim 20 wherein the periodic basis is every tenth frame.

* * * * *